United States Patent Office 3,026,257
Patented Mar. 20, 1962

3,026,257
METHOD OF ADDING HYDROGEN BROMIDE
TO VINYLARYL COMPOUNDS
Bruce W. Wilkinson, Charles T. Pumpelly, and Joseph L. Russell, Midland, Mich., assignors to The Dow Chemical Company, Midland, Mich., a corporation of Delaware
No Drawing. Filed Nov. 6, 1957, Ser. No. 694,740
14 Claims. (Cl. 204—154)

The present invention lies in the general field of organic chemistry and is more particularly concerned with a new and improved method for the abnormal addition of hydrogen bromide to monovinylaryl and divinylaryl compounds wherein the latter compounds are reacted with gaseous hydrogen bromide while being subjected to and under the reaction-catalyzing influence of a field of high energy radiation whereby abnormal addition of the hydrogen bromide is promoted to the substantial exclusion of the normal addition product. Quite advantageously, the method of the present invention is especially well suited to being practiced according to continuous processing arrangements.

In United States Letters Patent No. 2,307,552, it is disclosed that unsaturated aliphatic hydrocarbons can be reacted abnormally with hydrogen halides (including hydrogen bromide) by exposing such reactants to ultraviolet radiation. Such a reaction can also be accomplished with various vinylaryl compounds, especially when it is effected with the utilization of ultraviolet light of a certain character, as has been disclosed in the copending application for United States Letters Patent of Charles A. Gabriel, Joseph L. Russell and Henry Volk having Serial No. 675,029 which was filed on July 30, 1957, now Patent No. 2,925,369. The use of ultraviolet light for catalyzing the abnormal hydrobromination of vinylaryl compounds provides for many benefits over the practice of employing chemical catalysts for the same reaction.

However, when ultraviolet light is employed as a catalyst for the abnormal hydrobromination of vinylaryl compounds, certain difficulties are inherently encountered. For example, it is necessary in the practice of such techniques to employ reactors that have walls of special transparency, such as glass reactors, so as to permit the transmission therethrough of the ultraviolet light catalyst. Furthermore, because of the limited penetrating ability of ultraviolet light, the volumetric thickness or distance to the center of the reaction mass cannot be permitted to exceed certain dimensions. Besides, there seems to be unavoidably encountered in the practice of such a photochemical process a filming of the walls of the reactor adjacent to the reaction zone due to formation of polymeric by-products. This, of course, hinders the transmission of ultraviolet light through the transparent walls of the reactor and gradually results in loss of yield of the product during the course of a reaction using such variety of actinic catalysis for its accomplishment. As a consequence, shutdown of the operation to permit cleaning of the reactor in order that its ultraviolet light-transmitting efficiency may be regained is generally necessary at periodic intervals when an ultraviolet light catalyst is employed. In addition to this, the use of ultraviolet light as a catalyst ordinarily requires that refrigeration or some other cooling means be employed in conjunction with the ultraviolet light source to absorb excess heat energy and permit continued efficient output of the energy source. Furthermore, difficulties may be encountered in the use of ultraviolet light due to non-uniform intensity or penetration of such a catalyzing means through the reaction mass wherein the abnormal hydrobromination is being accomplished.

It would be advantageous to provide a more efficient and effective method for the abnormal hydrobromination of vinylaryl compounds which would not be susceptible to the mentioned difficulties and which would provide greater benefit and advantage than can be obtained by practice of heretofore known techniques. It would be particularly desirable, and of considerable commercial significance, if a satisfactorily operative continuous process for the abnormal addition of hydrogen bromide to vinylaryl compounds could be provided.

To this end, vinylaryl compounds can advantageously be abnormally hydrobrominated by a method in accordance with the present invention which comprises reacting a vinylaryl compound with gaseous hydrogen bromide while the reaction mass is subjected to and under the influence of a field of high energy radiation of at least about five or ten thousand rads per hour intensity until at least a portion of said vinylaryl compound has been abnormally hydrobrominated. The catalytic effect of the field of high energy radiation promotes abnormal addition of hydrogen bromide to the vinylaryl compound without incurring difficulties because of and despite film formation on the walls of the reactor which would reduce reaction yields. As is apparent, the formation of any film on the reactor walls because of polymerization in the reaction mass has no arresting influence on the transmission of the high energy radiation from its source into and through the reaction mass. In addition, the use of high energy radiation permits the utilization of greater thicknesses or volumetric bulk in the reaction mass and, as a consequence, larger effective reactor zones. Besides, no special transparent windows for transmission of the high energy radiation are required to be built into the apparatus employed in the practice of the invention and no cooling of the energy source is required. Furthermore, energy that is emitted from a source of high energy radiation is more predictable and constant than that which is obtained from ultraviolet light generating sources.

Of great significance and practicality is the fact that the method of the present invention is, as has been indicated, well adapted to be practiced as a continuous process. In order to accomplish such manner of operation, the solution of the vinylaryl compound in the inert solvent may be initially prepared either continuously or in batch volumes; then the dissolved vinylaryl compound mixed with at least a stoichiometric equivalent quantity of gaseous hydrogen bromide while it is continuously passed through a chamber wherein said dissolved vinylaryl compound in said solution is placed in intimate contact with said gaseous hydrogen bromide; and wherein, advantageously, it is maintained at a beneficial reaction temperature for the continuous operation (preferably between about 30 and 60° C.) and continuously exposed while in contact with said gaseous hydrogen bromide to the field of high energy radiation. After the continuous abnormal hydrobromination has been accomplished, the desired 2-bromoethyl-substituted product is continuously withdrawn in said solution from said chamber and subsequently recovered as the desired product.

Advantageously, when either batch-wise or continuous procedures are being followed, the dissolved vinylaryl compound is exposed to the field of high energy radiation until all or substantially all of the vinylaryl compound has been abnormally hydrobrominated.

The high energy radiation which may be employed for inducing the abnormal hydrobromination of the vinylaryl compounds in the practice of the present invention is of the type which provides emitted particles or photons having an intrinsic energy of a magnitude which is greater than the planetary electron binding energies that occur in the reacting materials. Such high energy radiation is available from various radioactive substances which provide beta or gamma radiation as, for example, radioactive elements (including cobalt-60 and cesium-137), nuclear reactor fission products and the like. If it is preferred or more expedient, however, high energy radiation from such sources as electron beam generators, including linear accelerators and resonant transformers, X-ray generators and the like may also be utilized. It is beneficial, as has been mentioned, to employ the high energy radiation in a field of at least about five thousand rads per hour intensity. A rad, as is commonly understood, is a unit that represents one hundred ergs of high energy that is absorbed per gram of material being exposed.

Advantageously, the intensity of the field of high energy radiation that is employed for the catalysis is sufficiently high so that the abnormal addition reaction predominates. Generally, this may be accomplished when the field of high energy radiation has a minimum intensity of about five or ten thousand rads per hour. High energy fields having intensities as great as ten million rads per hour may also be employed. Advantageously, the high energy is utilized at an intensity between about fifty thousand and one million rads per hour.

The time that is required for the accomplishment of the reaction is limited by the period which is necessary for the abnormal addition of the hydrogen bromide to the vinylaryl compound. Ordinarily, when the entire reaction mass is being subjected to the high energy radiation, the reaction can be accomplished within a period of time less than about twelve hours and generally less than about two hours. For example, when a continuous proces is being performed, a retention time of the dissolved vinylaryl compound in the irradiated reaction chamber that is between about ten minutes and an hour is frequently sufficient to accomplish the reaction. Of course, the optimum time of reaction in each case depends upon the volume and concentration of vinylaryl compound being irradiated and the radiation intensity employed, as well as upon the temperature at which the reaction mass is maintained and other factors, as hereinafter more fully indicated, involved in the present invention. Generally, suitable results can be achieved when the vinylaryl compound being abnormally hydrobrominated is processed so as to receive a total high energy dosage between about one thousand and a million rads.

The vinylaryl compounds that are operable in the practice of the present invention include both monovinylaryl and divinylaryl hydrocarbons and ring-substituted homologs and analogs thereof which react with hydrogen bromide to form 2-bromoethyl-substituted products. These include styrene and the various alkyl styrenes such as vinyltoluene, the dimethylstyrenes, vinylmesitylene, the chlorinated styrenes such as monochloro- and dichlorostyrenes, chloromethyl styrenes, alkoxystyrenes, such as methoxystyrene, hydroxystyrene, divinylbenzene, the various alkyldivinylbenzenes, the various chlorodivinylbenzenes, divinylnaphthalene and the like. Styrene, vinyltoluene and divinylbenzene may be abnormally hydrobrominated with great advantage in the practice of the present invention.

The vinylaryl compounds are most beneficially abnormally hydrobrominated while they are dissolved in an inert solvent so as to effect the most beneficial condition of dilution of the vinylaryl compound in the reaction mass. Preferably at least about 1 part by volume of the inert solvent is employed per part of vinylaryl compound in the preparation of the solutions of compounds that are hydrobrominated. Advantageously, the inert solvent that is employed may be an inert hydrocarbon or chlorinated hydrocarbon solvent for the vinylaryl compound, including such solvents as pentane, heptane, benzene, toluene, chlorobenzene, tetrachloroethylene, carbon tetrachloride, perchlorethylene, 1,1,1-trichloroethane and the like. Carbon tetrachloride or perchlorethylene can be employed with great advantage as the inert solvent medium for dissolution of the vinylaryl compound. Generally, both the conversion and yield of the abnormal addition product are found to increase as the proportion of inert solvent that is employed in the reaction mass is increased. Use of between about 1 and 12 parts by volume of inert solvent per part by volume of vinylaryl compound is found, for general purposes of comercial manufacture, to be most attractive. The upper limit, of course, is involved only for reasons of economical operation.

The reaction may be suitably accomplished while the reaction mass is being maintained at a temperature between the freezing point of the solvent and about 100° C. Ordinarily, carrying out of the reaction in the lower end of the temperature range results in an enhanced yield of the abnormal addition product that is desired. Therefore, it is frequently most advantageous to conduct the reaction at a temperature beneath about 60° C. The reaction can be satisfactorily accomplished under atmospheric or substantially atmospheric pressure or, if desired, may be effected under superatmospheric pressures.

It is ordinarily beneficial to maintain the reaction mass efficiently agitated during the abnormal hydrobromination in order to effect intimate contact of the hydrohalogenating reagent with the dissolved vinylaryl compound so as to obtain optimum results in the practice of the invention. Usually, the sparging or bubbling action of the gaseous hydrogen bromide accomplishes adequate agitation of the reaction mass. If desired, however, mechanical stirrers may be utilized. When very large reaction zones are involved, it may be beneficial to resort to mechanical appliances to ensure effective mixing.

The hydrogen bromide that is employed is used in at least a stoichiometric proportion with respect to the vinylaryl compound being hydrobrominated. Advantageously, the hydrogen bromide is employed in a quantity in the reaction mass that is in excess of stoichiometric requirements, as an excess quantity of up to about 15 or 20 percent. The hydrogen bromide gas can be passed into the solution of the vinylaryl compound being abnormally hydrobrominated while the reaction mass is at the desired temperature with the exposure to the field of high energy radiation being simultaneously accomplished.

The greatest benefit may frequently be derived in the practice of the present invention when styrene is being abnormally hydrobrominated and the reaction mass is made up to contain about three parts by volume of the inert solvent to each part by volume of the styrene; the temperature of reaction is maintained at about 50° C.; a hydrogen bromide excess of about 5 to 10 percent of stoichiometric requirements is maintained in intimate contact with the styrene solution; the radiation intensity employed is about one hundred thousand rads per hour and the sytrene being hydrobrominated is subjected to a total high energy dosage of about twenty-five thousand rads.

After the vinylaryl compound has been hydrobrominated and the 2-bromoethyl-substituted product obtained, the reaction mass (by either batch-wise or continuous techniques) is neutralized, suitably with anhydrous sodium carbonate or its equivalent, washed thoroughly with water, dried and distilled, preferably in the presence of iron or from an iron pot to decompose any residual amounts of normal addition product of hydrogen bromide and the vinylaryl compound which may be found. The desired abnormal addition product may then be recovered. Ordinarily, the desired product may be obtained in yields that are well in excess of 90 percent, based on conversion of the starting vinylaryl compound. Frequently, complete or substantially complete yields are realized, regardless of whether the operation is batch-wise or a continuous process. If it should be desired in continuous process operations, the reaction mass may be recycled through the reactor or passed through additional reactors to enhance the yields if the process is being operated under such conditions that relatively incomplete or less than theoretical conversions and yields are being obtained.

As is apparent, many types and varieties of apparatus can be employed suitably in the practice of the present invention. Those adapted to either batch-wise or continuous operation may be utilized with complete and equal satisfaction to meet whatever manufacturing needs that may require to be fulfilled. The following examples serve to illustrate how the present invention may be carried out in practice. In the examples, unless otherwise indicated, all parts and percentages are to be taken by weight.

*Example 1*

About 117 grams of a mixture of about 5 parts by volume of carbon tetrachloride and one part by volume of styrene was reacted with gaseous hydrogen bromide by sparging the gas into the sample while it was maintained at a temperature of about 25° C. and while the reaction mass was being subjected to a field of high energy gamma radiation from a cobalt-60 source at a dose rate of about 400,000 rads per hour. The hydrogen bromide was passed into the solution at a rate of about 10 grams per hour. The reaction mass was maintained in a glass vessel and was efficiently agitated during the course of the reaction. The sparging and the radiation was continued for a total reaction time of about 1.6 hours during which the reaction mass experienced a total weight gain of about 16.2 grams. The recovered product had a boiling range of 217–218° C. under about 734 mm. of mercury pressure and, upon infrared spectroscopic analysis, was identified as 2-bromoethyl benzene. The product was obtained with a yield of about 97 percent, based on converted styrene starting material.

*Example 2*

A mixture of about 900 ml. of carbon tetrachloride and 300 ml. of styrene was prepared. The resulting solution was passed through the reaction zone at a rate of about 200 ml. per hour. The reaction zone consisted of a 50 cc. volume glass reactor through which the liquid feed was continuously passed. During the passage of the solution through the reaction zone, hydrogen bromide was continuously added thereto in gaseous form and passed concurrently therewith through the glass reactor at a rate of about 2 grams per minute. The reaction mass passing through the reaction zone was continuously subjected to a field of high energy gamma radiation from a cobalt-60 source at a dose rate of about 500,000 rads per hour while the reaction mass was maintained during its passage through the reaction zone at a temperature of about 25° C. The reacted product was continuously removed from the reaction zone and subsequently recovered by distillation from an iron pot. As in the first example, the product had a boiling range from 217–218° C. under about 734 mm. of mercury pressure. Upon infrared spectroscopic analysis, it too was identified as 2-bromoethyl benzene. The product was obtained in the single phase with a yield of about 98 percent, based on converted styrene starting material.

*Example 3*

The procedure of the second example was duplicated with the exception that the radiation intensity employed was at a dose rate of about 100,000 rads per hour. Ninety percent single phase yields of the desired product were obtained.

*Example 4*

The procedure of the second example was again followed with the exception that the reaction zone had a volume of about 92 cubic centimeters and the feed rate of the reaction mass therethrough was approximately 200 ml. per hour. The hydrogen bromide was added simultaneously to the styrene solution passing through the reaction zone at such a rate that a substantial excess (about 10 percent over stoichiometric requirements) was present at all times. The temperature of reaction was about 40° C. and the high energy field had an intensity about 390,000 rads per hour, using a similar cobalt-60 source for the gamma radiation. Single phase yields of about 93.7 percent of 2-bromoethyl benzene were obtained.

*Example 5*

The procedure of Example 4 was repeated excepting to pass the reaction mass through the reaction zone at a temperature of about 50° C. The continuous yield of 2-bromoethyl benzene from the converted styrene starting material was 96.4 percent.

*Example 6*

Repeating the procedure of Example 4 excepting to employ a 70° C. reaction temperature, the product was obtained in 53 percent continuous yield.

*Example 7*

The procedure of Example 4 was again repeated excepting to feed the styrene solution through the reaction zone at a rate of about 265 ml. per hour and to employ a reaction temperature of about 50° C.; to use a hydrogen bromide excess of about 10 percent; and to maintain the intensity of the high energy gamma radiation field at about 100,000 rads per hour. A continuous 97.5 percent yield of 2-bromoethyl benzene was obtained.

*Example 8*

Using the same procedure as set forth in Example 7, excepting to employ as a reaction mass a dissolved mixture of about 1.5 parts by volume of carbon tetrachloride to each part by volume of styrene, a continuous yield of about 73.2 percent 2-bromoethyl benzene product was obtained.

*Example 9*

Following the general procedure of Examples 2 through 8, the abnormal addition of hydrogen bromide to styrene was accomplished under various conditions wherein the excess of the hydrobrominating reagent was changed. In the following tabulation there is set forth the difference in the results observed with respect to yield of the desired 2-bromoethyl benzene (2-BEB) product using different excess quantities of gaseous hydrogen bromide of the reaction.

| Run | Percent Excess HBr | Percent Yield 2-BEB |
|---|---|---|
| "A" | 7 | 90.6 |
| "B" | 9.3 | 96 |
| "C" | 20 | 97 |

*Example 10*

The general procedure of Examples 2–8 was again duplicated excepting to vary the radiation intensity of the high energy field. The results are set forth in the following tabulation.

| Run | Radiation Intensity, Rads per Hour | Percent Yield 2-BEB |
|---|---|---|
| "D" | 390,000 | 97.9 |
| "E" | 100,000 | 97.2 |
| "F" | 50,000 | 88.5 |

*Example 11*

The procedure of Examples 2–8 was duplicated several times excepting to vary the ratio of solvent to vinylaryl compound, i.e., carbon tetrachloride to styrene, in the reaction mass. The results are set forth in the following tabulation.

| Run | Volume Ratio, CCl₄: Styrene | Percent Yield 2-BEB |
|---|---|---|
| "G" | 1.5:1 | 73 |
| "H" | 3:1 | 97.9 |
| "I" | 5:1 | 99 |

In contrast, when the procedure was repeated excepting to utilize a reaction mass comprised only of styrene without any solvent being present, a 95 percent yield of undesired, normally added, 1-bromoethyl benzene, based on reacted styrene, was obtained.

*Example 12*

The general procedure of Examples 2–8 was repeated in several additional runs excepting to vary the temperature of the reaction mass during its passage through the reaction zone. The results are set forth in the following tabulation.

| Run | Temperature, °C. | Percent Yield 2-BEB |
|---|---|---|
| "J" | 10 | 81.7 |
| "K" | 30 | 93.4 |
| "L" | 50 | 96.4 |
| "M" | 60 | 94.2 |
| "N" | 75 | 53.0 |

At 75° C., some low molecular weight polymer was observed to be obtained in the product.

Similar excellent results may be obtained when the foregoing is repeated by either batch-wise or continuous procedures excepting to substitute vinyltoluene, divinylbenzene or other of the vinylaryl compounds mentioned as being suitable for the starting material and to utilize other of the mentioned inert solvents or their known equivalents for dissolving the vinylaryl compound to be abnormally hydrobrominated. Excellent results may also be obtained when the foregoing is repeated excepting to conduct the reaction at other temperatures within the range indicated in the foregoing to be operable, using a high energy radiation at other intensities within the indicated ranges as may be generated from cobalt-60 or other high energy sources, including nuclear reactor fission products and X-ray and electron beam generators. Likewise, as is apparent, practice of the present invention can also be readily accomplished in apparatus fabricated from other than glass materials of construction.

What is claimed is:

1. Method for abnormally adding hydrogen bromide to a vinylaryl compound which method comprises dissolving one part by volume of a vinylaryl compound in at least one part by volume of an inert solvent vehicle therefor, said vinylaryl compound being the type that reacts with hydrogen bromide to form 2-bromoethyl-substituted products; maintaining said solution of the vinylaryl compound in a reaction zone at a temperature between the freezing point of the solvent and about 100° C.; contacting the dissolved vinylaryl compound with gaseous hydrogen bromide; and exposing the dissolved vinylaryl compound while it is in contact with said gaseous hydrogen bromide to a field of high energy ionizing radiation of an intensity between about five thousand and ten million rads per hour until a dosage of from about one thousand to about a million rads is absorbed by said vinylaryl compound being abnormally hydrobrominated to convert at least a portion of said vinylaryl compound to an abnormally hydrobrominated product.

2. The method of claim 1, wherein each part by volume of said vinylaryl compound is dissolved in between about 1 and 12 parts by volume of said inert solvent.

3. The method of claim 1, wherein each part by volume of said vinylaryl compound is dissolved in about 3 parts by volume of said inert solvent.

4. The method of claim 1, wherein the inert solvent is carbon tetrachloride.

5. The method of claim 1, wherein the inert solvent is perchlorethylene.

6. The method of claim 1, wherein said solution of the vinylaryl compound is maintained at a temperature beneath about 60° C.

7. The method of claim 1, wherein the vinylaryl compound is styrene.

8. The method of claim 1, wherein the vinylaryl compound is vinyltoluene.

9. The method of claim 1, wherein the vinylaryl compound is divinylbenzene.

10. The method of claim 1, wherein the intensity of said field of high energy radiation is between about fifty thousand and a million rads per hour.

11. The method of claim 1, wherein said solution of the dissolved vinylaryl compound is mixed with a quantity of gaseous hydrogen bromide that is not more than about 20 percent in excess of stoichiometric requirements.

12. The method of claim 1, wherein said vinylaryl compound is styrene and the said solution of the dissolved styrene is made up to contain about 3 parts by volume of the inert solvent to each part by volume of styrene; and wherein said styrene solution is mixed with a quantity of said gaseous hydrogen bromide that is between about 5 and 10 percent in excess of stoichiometric requirements; and wherein said mixture of gaseous hydrogen bromide and the solution of the dissolved styrene is maintained at a temperature of about 50° C. during said abnormal hydrobromination; and wherein the dissolved styrene solution is exposed to said field of high energy radiation at an intensity of about one hundred thousand rads per hour and is maintained in said reaction zone for such a period of time that the styrene being hydrobrominated receives a total high energy dosage of about twenty-five thousand rads.

13. The method of claim 1, wherein said mixture of the gaseous hydrogen bromide and the solution of the dissolved vinylaryl compound is continuously passed through said reaction zone while said dissolved vinylaryl compound in said solution is in intimate contact with said gaseous hydrogen bromide wherein said mixture is maintained at a temperature between about 30 and 60° C., in which reaction zone the dissolved vinylaryl compound in said solution is continuously exposed to said high energy field while it is in contact with said gaseous hydrogen bromide until at least a portion of said vinylaryl compound is abnormally hydrobrominated; and including the additional step of continuously withdrawing the 2-bromoethyl-substituted product in said solution from said reaction zone; and subsequently recovering said product.

14. A method in accordance with the method set forth in claim 13, wherein said mixture of the gaseous hydrogen bromide and the solution of the dissolved vinylaryl compound is maintained in said reaction zone and continuously exposed to said field of high energy radiation until at least about 90 percent of said vinylaryl compound is abnormally hydrobrominated to form said 2-bromoethyl-substituted product.

References Cited in the file of this patent

UNITED STATES PATENTS

| 2,307,552 | Vaughan et al. | Jan. 5, 1943 |
| 2,540,126 | Lacomble et al. | Feb. 6, 1951 |

OTHER REFERENCES

Cox et al.: "Chem. & Ind.," pages 1277, 1278, Nov. 3, 1956.

Bourne et al.: "Chem. & Ind.," pages 1372–1376, Nov. 24, 1956.